(12) United States Patent
Glemarec et al.

(10) Patent No.: US 12,404,821 B2
(45) Date of Patent: Sep. 2, 2025

(54) SUSPENSION OF A TRIPLE-FLOW AIRCRAFT TURBINE ENGINE

(71) Applicants: GENERAL ELECTRIC COMPANY, New York, NY (US); SAFRAN AIRCRAFT ENGINES, Paris (FR); SAFRAN NACELLES, Gonfreville-l'Orcher (FR)

(72) Inventors: Guillaume Glemarec, Moissy-Cramayel (FR); Nicolas Maurice Herve Aussedat, Moissy-Cramayel (FR); Pierre Charles Caruel, Moissy-Cramayel (FR); Mathieu Marc Christian Gaillot, Moissy-Cramayel (FR); Jean-Baptiste Manuel Nicolas Vignes, Moissy-Cramayel (FR)

(73) Assignees: GENERAL ELECTRIC COMPANY, Schenectady, NY (US); SAFRAN AIRCRAFT ENGINES, Paris (FR); SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/852,382

(22) PCT Filed: Apr. 15, 2022

(86) PCT No.: PCT/FR2022/050719
§ 371 (c)(1),
(2) Date: Sep. 27, 2024

(87) PCT Pub. No.: WO2023/198962
PCT Pub. Date: Oct. 19, 2023

(65) Prior Publication Data
US 2025/0215830 A1  Jul. 3, 2025

(51) Int. Cl.
*F02C 7/20* (2006.01)
*F02K 3/077* (2006.01)

(52) U.S. Cl.
CPC ............. *F02C 7/20* (2013.01); *F02K 3/077* (2013.01)

(58) Field of Classification Search
CPC ...... B64D 27/16; B64D 27/40; B64D 27/402; B64D 27/406; F02C 3/13; F02C 7/20; F02K 3/04; F02K 3/077
See application file for complete search history.

(56) References Cited

U.S. PATENT DOCUMENTS

| | | | | |
|---|---|---|---|---|
| 6,209,311 B1 * | 4/2001 | Itoh | ............ | F02K 3/065 60/226.3 |
| 9,091,207 B2 * | 7/2015 | Chanez | ............ | F02C 7/05 |

(Continued)

FOREIGN PATENT DOCUMENTS

| | | | | | |
|---|---|---|---|---|---|
| CN | 116412042 | A | * | 7/2023 | ............ F02K 3/02 |
| CN | 118984908 | A | * | 11/2024 | ............ B64D 27/02 |

(Continued)

OTHER PUBLICATIONS

International Search Report received for PCT Patent Application No. PCT/FR2022/050719, mailed on Dec. 12, 2022, 7 pages (3 pages of English Translation and 4 pages of Original Document).

*Primary Examiner* — Craig Kim
(74) *Attorney, Agent, or Firm* — WOMBLE BOND DICKINSON (US) LLP (57) ABSTRACT

A triple-flow turbine engine for an aircraft, this turbine engine having a longitudinal axis and including upstream suspension elements which are located in a first plane perpendicular to the axis and are connected or fixed to the gas generator of the turbine engine; downstream suspension elements which are located in a second plane perpendicular to the axis and are connected or fixed to the gas generator;

(Continued)

and thrust-absorbing rods which include first ends which are connected or fixed to the gas generator and opposing second ends which are located in a third plane perpendicular to the axis, wherein the first, second and third planes are located at a cold compartment of the gas generator.

15 Claims, 8 Drawing Sheets

(56) References Cited

U.S. PATENT DOCUMENTS

| | | | |
|---|---|---|---|
| 11,555,454 B2* | 1/2023 | Mouly | F02C 7/06 |
| 11,851,201 B2* | 12/2023 | Garnaud | B64D 27/40 |
| 2005/0178889 A1* | 8/2005 | Machado | B64D 27/404 |
| | | | 244/54 |
| 2013/0225353 A1 | 8/2013 | Gallet et al. | |
| 2015/0285185 A1* | 10/2015 | Caruel | F02K 1/72 |
| | | | 239/265.19 |
| 2021/0003097 A1 | 1/2021 | Garnaud et al. | |
| 2021/0323690 A1* | 10/2021 | Garnaud | B64D 27/40 |
| 2022/0235710 A1* | 7/2022 | Mouly | F02K 3/077 |
| 2024/0270396 A1* | 8/2024 | Beutin | B64D 27/402 |
| 2025/0153415 A1* | 5/2025 | Cree | B29C 48/885 |

FOREIGN PATENT DOCUMENTS

| | | | | |
|---|---|---|---|---|
| CN | 119467091 A | * | 2/2025 | |
| CN | 119508069 A | * | 2/2025 | F02C 7/22 |
| FR | 2981989 A1 | | 5/2013 | |
| FR | 2987416 A1 | | 8/2013 | |
| FR | 3008462 A1 | | 1/2015 | |
| FR | 3008463 A1 | | 1/2015 | |
| FR | 3041054 A1 | | 3/2017 | |
| FR | 3078998 A1 | | 9/2019 | |
| WO | 2010/092263 A1 | | 8/2010 | |
| WO | WO-2022248791 A1 | * | 12/2022 | B64D 27/40 |
| WO | WO-2024121464 A1 | * | 6/2024 | |
| WO | WO-2024200946 A1 | * | 10/2024 | |

* cited by examiner

SUSPENSION OF A TRIPLE-FLOW AIRCRAFT TURBINE ENGINE

TECHNICAL FIELD OF THE INVENTION

The present invention relates to the field of the suspension of a triple-flow turbine engine, in particular of aircraft.

TECHNICAL BACKGROUND

The prior art comprises in particular the documents WO-A1-2010/092263, FR-A1-2 981 989, FR-A1-2 987 416, FR-A1-3 008 462, FR-A1-3 008 463, FR-A1-3 041 054, FR-A1-3 078 998 and U.S. Pat. No. 9,091,207 B2.

Figure 1:
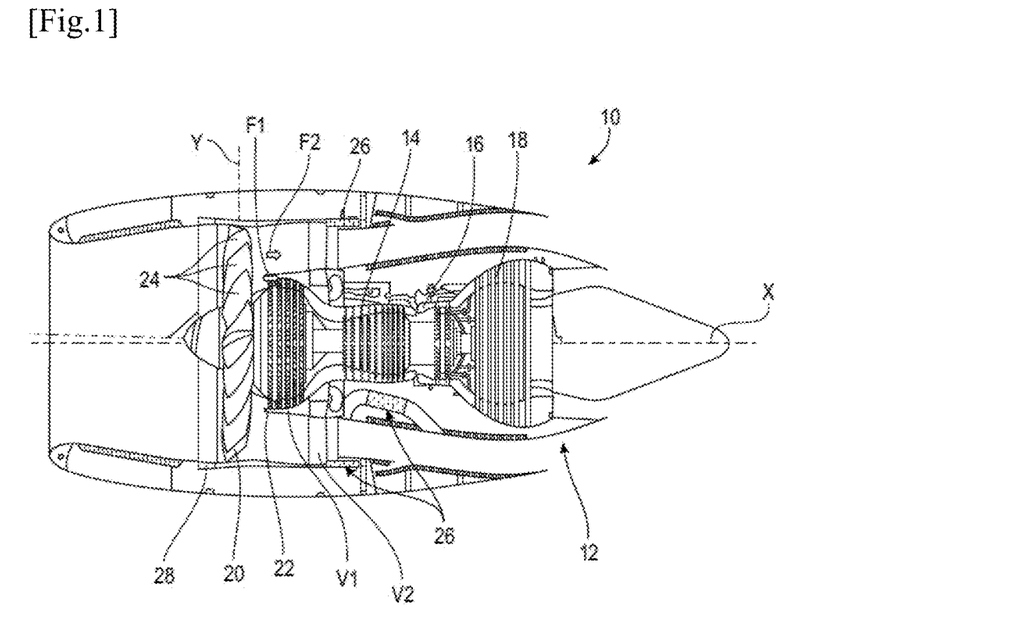
FIG. 1 is a schematic axial sectional view of a double-flow turbine engine for an aircraft.

As shown in FIG. 1, an aircraft turbine engine 10 generally comprises a gas generator 12 comprising at least one compressor 14, an annular combustion chamber 16 and at least one turbine 18.

The turbine engine 10 further comprises at least one propulsion propeller 20 which is driven by a shaft of the turbine 18.

The gas generator 12 comprises an annular splitter nose 22 for separating two annular ducts V1, V2 of an internal primary flow F1 inside the gas generator 12, and of an external secondary flow F2 around the gas generator 12 respectively.

When the propulsion propeller 20 is located upstream of the gas generator 12 as in the example shown, it is called fan and its purpose is to accelerate the air drawn in. A part of the airflow exiting the fan flows around the gas generator 12 to form the secondary flow F2 which allows to generate most of the thrust produced by the turbine engine 10. The remaining of the air flow exiting the fan enters the gas generator 12 to form the primary flow F1. This air is compressed in the or each compressor 14, then mixed with fuel and burned in the combustion chamber 16. The combustion gases are then expanded in the or each turbine 18 in order to rotate the rotor of the turbine and thus the propulsion propeller 20.

The propeller 20 comprises vanes 24 that generally have an angular position, referred to as pitch, that is stationary about an axis Y perpendicular to the longitudinal axis X of the turbine engine 10. Even in the low speed phases of the engine, such as idling, this pitch is configured so that the flow rate of the secondary flow F2 generated is sufficient to feed fluid/air surface exchangers 26, which may or may not be flat, installed in the duct for the flow of the secondary flow F2. These exchangers 26 are needed to cool equipment of the turbine engine.

Figure 2:
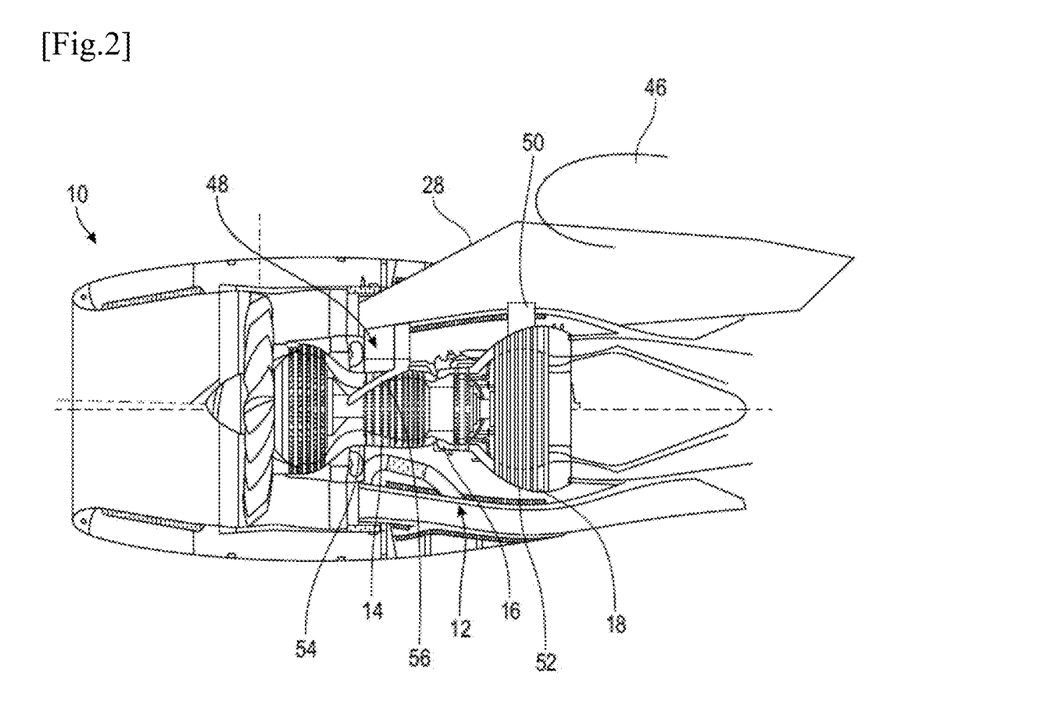
FIG. 2 is a schematic axial sectional view of the turbine engine of FIG. 1 and its suspension pylon to an aircraft, and illustrates a configuration of the suspension members.
Figure 3:
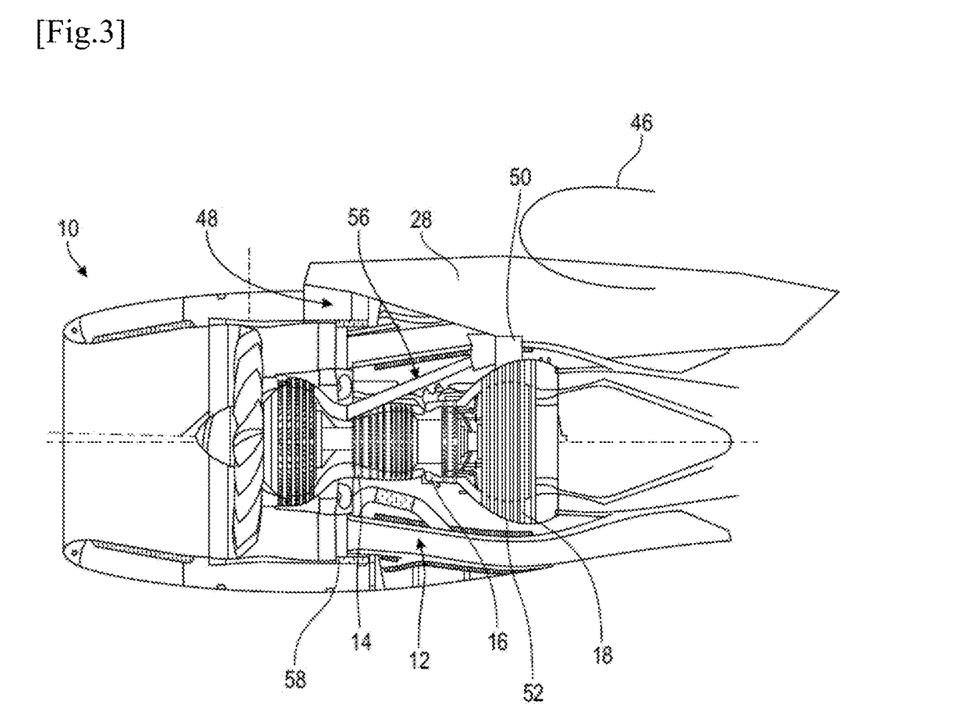
FIG. 3 is a schematic axial sectional view of the turbine engine of FIG. 1 and its suspension pylon to an aircraft, and illustrates an alternative configuration of the suspension members.

FIGS. 2 and 3 show two possible configurations for the suspension of the turbine engine 10 of FIG. 1. A pylon 28 is used to attach and suspend the turbine engine 10 from a part of the aircraft, such as a wing 46 for example. The pylon 28 has a generally elongated shape along the longitudinal axis X of the turbine engine 10.

The turbine engine 10 comprises upstream suspension members 48 and downstream suspension members 50. In the suspension configuration of FIG. 2, the downstream suspension members 50 are attached to a turbine casing 52 of the turbine engine 10, and the upstream suspension members 48 are attached to an intermediate casing 54 of the turbine engine 10. Thrust-absorbing rods 56 extend from the upstream suspension members 48 to the gas generator 12.

In the suspension configuration of FIG. 3, the downstream suspension members 50 are attached to the turbine casing 52 of the turbine engine 10, and the upstream suspension members 48 are attached to a fan casing 58 of the turbine engine 10. Thrust-absorbing rods 56 extend from the downstream suspension members 50 to the gas generator 12.

To improve the performance of the engine (higher thrust and lower fuel consumption), some engine architectures aim to increase the bypass ratio (BPR) by increasing the diameter of the propeller 20. In order to limit the mass of the turbine engine 10, the shroud 28 (with the fan casing 58) located around the propulsion propeller 20 may be removed, and the vanes 24 of the propeller 20 may be made steerable, and thus variable in pitch, to control the thrust level of the turbine engine.

However, it happens that in certain phases such as ground idle, the run-up or thrust reversal phases, the flow rate of the secondary flow F2 is no longer sufficient for the thermal management of the turbine engine which needs heat exchange between fluids and air in order to ensure the cooling of its equipment and its optimal operation.

To address this problem, it has already been proposed to provide an additional bypass flow dedicated to the thermal management of the turbine engine.

Figure 4:
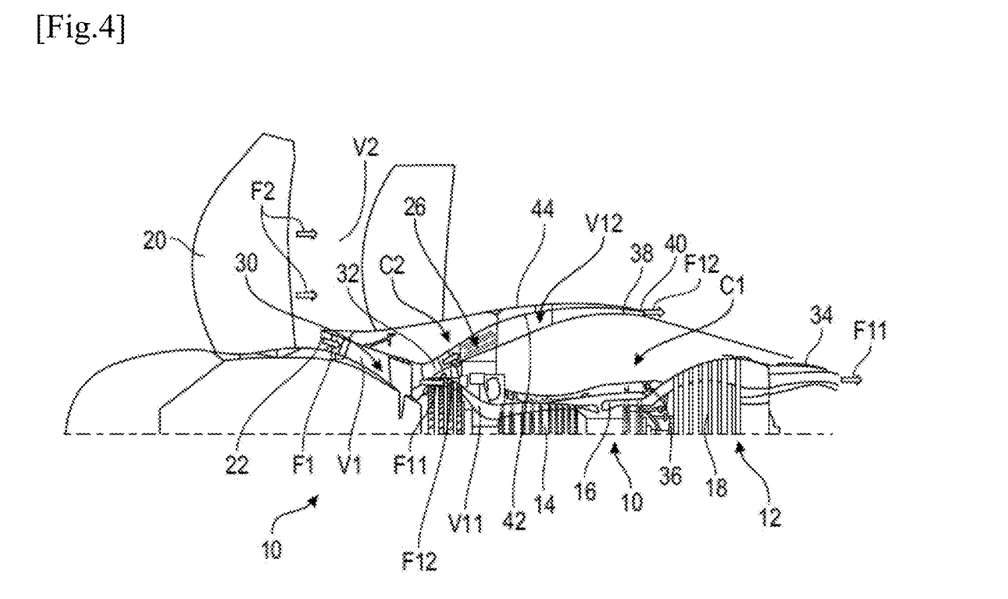
FIG. 4 is a schematic half-view in axial section of a triple-flow turbine engine for an aircraft.

As shown in FIG. 4, the turbine engine 10 then comprises a secondary propeller 30 driven in rotation by a shaft of the gas generator 12. This propeller 30 is located in the duct V1 for the flow of the primary flow F1 and upstream of a second annular splitter nose 32 separating two annular ducts V11, V12 for the respective flow of a first internal flow F11 and a second external flow F12.

The exchangers 26 are housed in the flow duct V12 and are fed by the second external flow F12. The first internal flow F11 feeds the compressor 14, as mentioned above.

FIG. 4 allows to show that the gas generator 12 comprises two annular compartments C1, C2 which extend around the axis X.

The first annular compartment C1 is called hot compartment because it is relatively close to the duct V11 and therefore more exposed to the heat generated by the compression, by the combustion chamber 16 and by the combustion gases. This hot compartment C1 extends axially between the second splitter nose 32 and a first nozzle 34 for ejecting the first internal flow F11 from the turbine or the turbines. This hot compartment C1 is further delimited radially by first and second annular walls 36, 38, respectively internal and external, which extend coaxially around each other. The first wall 36 externally defines the duct V11 for the flow of the first internal flow F11, and the second wall 38 internally defines the duct V12 for the flow of the second external flow F12.

The second annular compartment C2 is called cold compartment because it is less exposed to heat, in particular because it is separated from the hot compartment by the duct V12. This cold compartment C2 extends axially between the first splitter nose 22 and a second nozzle 40 for ejecting the second external flow F12. This cold compartment C2 is further delimited radially by third and fourth annular walls 42, 44, respectively internal and external, which extend coaxially around each other. The third wall 42 externally defines the duct V12 for the flow of the second external flow F12, and the fourth wall 44 internally defines the duct V2 for the flow of the secondary flow F2.

Lot of equipment in the turbine engine 10 are installed in the hot compartment C1, which is large. The cold compartment C2 is relatively small and is reserved for equipment that cannot withstand the temperatures of the hot compartment C1, in particular the electronic equipment.

This type of installation has several consequences:

The equipment in the hot compartment C1 shall be thermally protected. These thermal protections constitute additional volumes and masses to be installed in an already very constrained environment, which tends to hinder the accessibility for the inspections and the maintenance of the turbine engine.

A localized ventilation must be added in the hot compartment C1 for certain (electronic) equipment that is more sensitive to heat and cannot be installed in the cold compartment C2 because space is too limited there.

The equipment has a reduced service lifetime in the hot compartment C1 and this restrictive environment has consequences for its design: the choice of their technologies is limited and its mass is increased.

Figure 5:
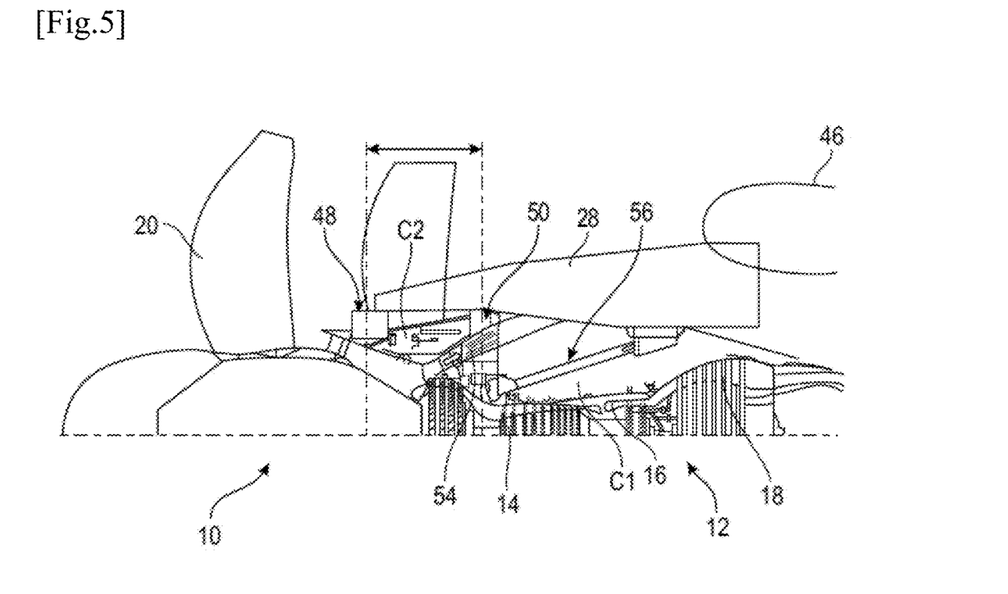
FIG. 5 is a schematic axial sectional view of the turbine engine of FIG. 4 and its suspension pylon to an aircraft, and illustrates a configuration of the suspension members.

FIG. 5 shows a possible configuration for the suspension of the turbine engine 10 of FIG. 4. The upstream 48 and downstream 50 suspension members are located at the level of the cold compartment C2. The downstream suspension members 50 are connected to the intermediate casing 54 and the thrust-absorbing rods 56 extend from the gas generator 12 to an attachment point on the pylon 28 which is located well downstream of the suspension members 48, 50.

Figure 6:
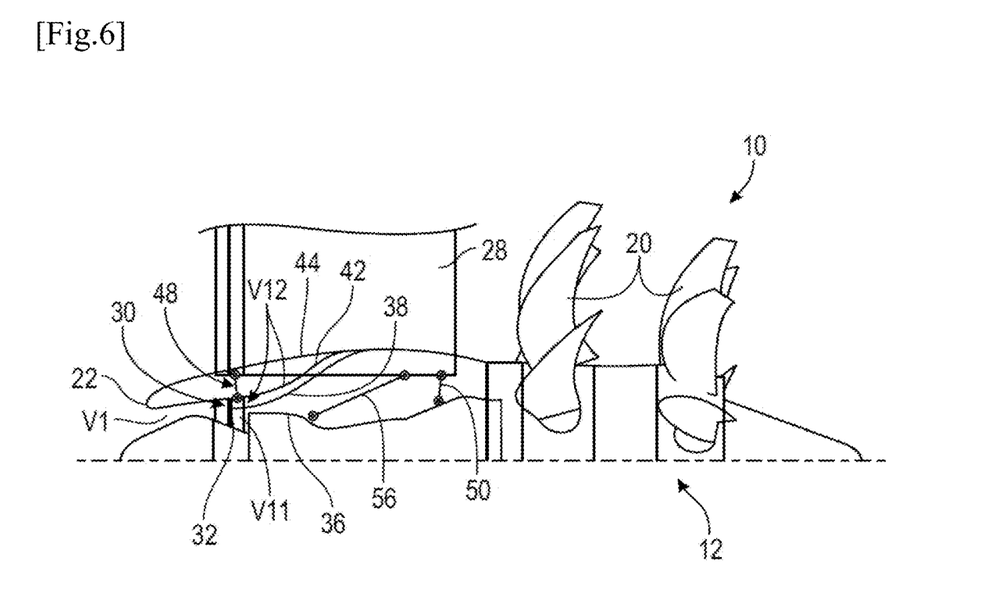
FIG. 6 is a schematic axial sectional view of a downstream propulsion propeller turbine engine and its suspension pylon to an aircraft, and illustrates a configuration of the suspension members.

FIG. 6 illustrates another type of triple-flow turbine engine 10, in which the main propeller 20 is located downstream of the gas generator 12. This main propeller 20 is part of a counter-rotating, non-shrouded propeller doublet.

This FIG. 6 shows a possible configuration for the suspension of the turbine engine 10. The upstream suspension members 48 are located at the level of the cold compartment C2, and the downstream suspension members 50 are located at the level of the hot compartment C1. The thrust-absorbing rods 56 extend from the gas generator 12 to an attachment point on the pylon 28 which is located between the suspension members 48, 50.

The different suspension configurations mentioned above have constraints:
  the upstream and downstream suspension members 48, 50 are located in planes P1, P2 perpendicular to the longitudinal axis X of the turbine engine 10, which are located at a relatively small axial distance (called the center distance) from each other, which generates significant forces in the 20 members 48, 50;
  the distribution of the forces between the upstream and downstream suspension members 48, 50 is also problematic because the center of gravity of the turbine engine 10 is not in the middle between the two suspension planes P1, P2; and
  the thrust of the turbine engine 10, which is generated in particular by the propeller 20, passes through casings to be transmitted to the pylon 28 by the connecting rods 56.

The invention provides a solution allowing to solve some or all of these problems.

SUMMARY OF THE INVENTION

The invention relates to a triple-flow turbine engine for an aircraft, this turbine engine having a longitudinal axis and comprising:
  a gas generator comprising at least one compressor, an annular combustion chamber, and at least one turbine,
  at least one main propeller rotated by a shaft of the gas generator,
  the gas generator comprising:
  a first annular splitter nose for separating two annular ducts for the respective flow of an internal primary flow inside the gas generator and of an external secondary flow around the gas generator,
  a second annular splitter nose for separating two annular ducts for the respective flow of a first internal flow and of a second external flow,
  a first nozzle for ejecting the first internal flow,
  a second nozzle for ejecting the second external flow,
  a first annular compartment, referred to as hot compartment, extending axially between the second splitter nose and the first nozzle, and between first and second annular walls, respectively internal and external, which extend, preferably coaxially, around each other, the first wall externally defining said duct for the flow of the first internal flow, and said second wall internally defining said duct for the flow of the second external flow,
  a second annular compartment, referred to as cold compartment, extending axially between the first splitter nose and the second nozzle, and between third and fourth annular walls, respectively internal and external, which extend, preferably coaxially, around each other, the third wall externally defining said duct for the flow of the second external flow, and said fourth wall internally defining said duct for the flow of the secondary flow,
  upstream suspension members of the turbine engine, which are located in a first plane perpendicular to said axis and which are connected or attached to the gas generator,
  downstream suspension members of the turbine engine, which are located in a second plane perpendicular to said axis and which are connected or attached to the gas generator, and
  thrust-absorbing rods which comprise first ends connected or attached to the gas generator and opposite second ends located in a third plane perpendicular to said axis,
  characterized in that said first, second and third planes are located axially between the first splitter nose and the second nozzle, and in that at least one part of said upstream and downstream suspension members are connected or attached to said third wall.

In the present application, the terms "upstream" and "downstream" refer to the flow direction of the gases in the turbine engine.

The invention thus proposes to bring the suspension planes of the turbine engine axially closer to each other and to position them at the level of the third wall and thus of the cold compartment of the gas generator. The suspension members are connected or attached to the third wall, which is thus configured to transmit the forces associated with the weight and the thrust of the turbine engine to the pylon. This third wall is therefore at least partly structural, which means that it has a rigidity and a mechanical strength that allow it to ensure the transmission of the above-mentioned forces.

Advantageously, the turbine engine is devoid of additional suspension members downstream of said downstream suspension members or of the thrust-absorbing rods so that the turbine engine is attached in a cantilevered manner to the pylon.

The turbine engine according to the invention may comprise one or more of the following characteristics, taken in isolation from each other, or in combination with each other:
  the downstream suspension members are attached or connected to said third wall;
  the downstream suspension members are located in the cold compartment;
  the upstream suspension members are attached to the third wall and/or the fourth wall;

the upstream suspension members are located just downstream of said first splitter nose;

said thrust-absorbing rods extend from the upstream suspension members or downstream of these members to connection points on the gas generator, these connection points being located inside the third wall;

said connection points are located upstream of said second splitter nose; alternatively, they could be located downstream of said second splitter nose;

at least one part of said second and third walls are connected together by tubular reinforcements or arms, to form an assembly;

the second and third walls comprise openings and removable hatches for closing these openings;

said assembly forms a segment in one piece;

said assembly comprises a first segment in one piece and a second segment which can be detached from the first segment and which can itself be in one piece or formed of two half-shells articulated with respect to each other about an axis substantially parallel to said longitudinal axis;

at least one heat exchanger is located in said second external duct, and/or at least one equipment, such as an accessory box or gear box, is located in said cold compartment;

said at least one main propeller is located upstream of the gas generator;

said at least one main propeller is located downstream of the gas generator;

the turbine engine comprises a secondary propeller driven in rotation by a shaft of the gas generator, this propeller being located in the duct for the flow of the primary flow and upstream of said second annular splitter nose;

the pylon comprises an upstream end located between two adjacent stator vanes extending into the duct for the flow of the secondary flow, or located at the level of a root of one of these vanes;

the upstream suspension members are located between two adjacent stator vanes extending in the secondary flow duct, or located at the level of a root of one of these vanes;

the upstream suspension members are located downstream of the first splitter nose, and upstream or in line with the second splitter nose;

said assembly is attached downstream of a casing located between two compressors of the gas generator.

The present invention also relates to an assembly comprising a turbine engine as described above, and a pylon for hanging this turbine engine to an aircraft, the pylon having a generally elongated shape and being connected or attached respectively to the upstream and downstream suspension members of the turbine engine.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

FIGS. 1 to 6 have been described above.

Figure 7:
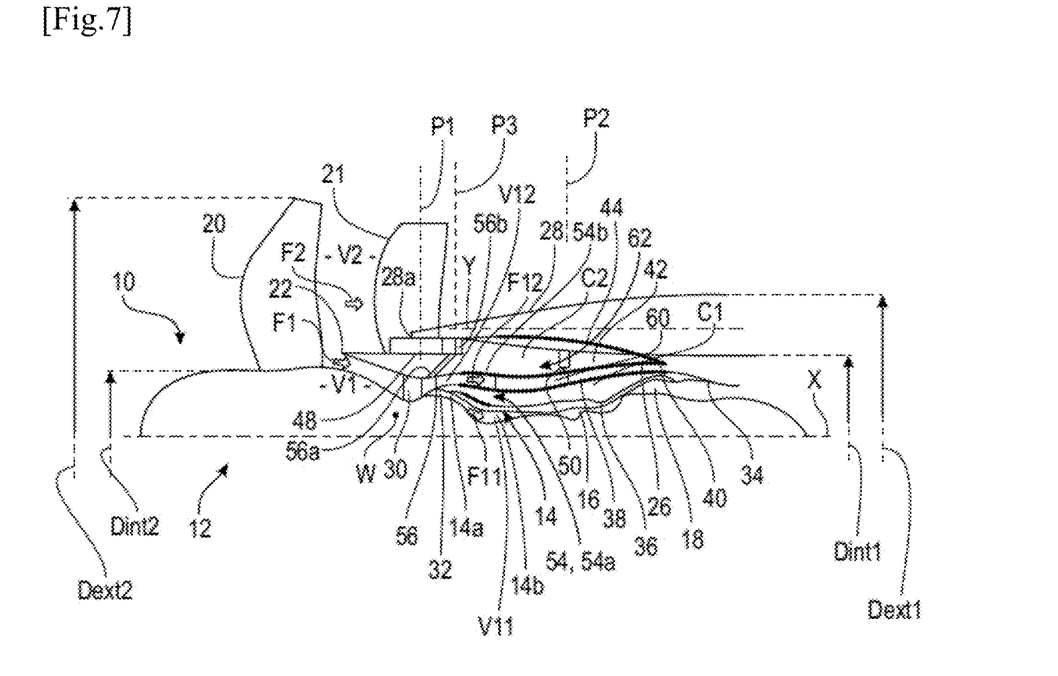
FIG. 7 is a view similar to that of FIG. 5 and illustrates an embodiment of a turbine engine according to the invention and its suspension pylon to an aircraft.

FIG. 7 represents an aircraft turbine engine 10 according to an embodiment of the invention, as well as a pylon 28 for suspending the turbine engine 10 to a part of an aircraft, such as a wing for example.

The pylon 28 has a generally elongated shape along an axis Y that is parallel to the longitudinal axis X of the turbine engine 10. The pylon 28 comprises an external diameter noted Dext1 and an internal diameter noted Dint1.

The turbine engine 10 is similar to that shown in FIG. 4. It comprises a gas generator 12 comprising at least one compressor 14, an annular combustion chamber 16 and at least one turbine 18.

The gas generator 12 preferably comprises two successive compressors 14a, 14b. The compressor 14a located upstream is a low pressure compressor. The compressor 14b located downstream is a high pressure compressor. The two compressors 14a, 14b are separated from each other by an intermediate casing 54 or inter-compressor which comprises an internal hub 54a and a ferrule 54b extending around the hub 54a and connected to the hub by arms not shown.

The turbine engine 10 further comprises a propulsion propeller 20 which is located upstream of the gas generator 12 and is driven by a shaft of the turbine 18. The propeller 20 has an external diameter noted Dext2 and an internal diameter noted Dint2.

The gas generator 12 comprises an annular splitter nose 22 for separating two annular ducts V1, V2 for the respective flow of an internal primary flow F1 inside the gas generator 12, and of an external secondary flow F2 around the gas generator 12.

The turbine engine 10 comprises a secondary propeller 30 driven in rotation by a shaft of the gas generator 10. This propeller 30 is located in the duct V1 for the flow of the primary flow F1 and upstream of a second annular splitter nose 32 separating two annular ducts V11, V12 for the respective flow of a first internal flow F11 and a second external flow F12.

Exchangers 26 are located in the duct V12 and are fed by the second external flow F12. The first internal flow F11 feeds the compressor 14, as mentioned above.

The gas generator 12 comprises two annular compartments C1, C2 which extend around the axis X.

The first annular compartment C1, or hot compartment, extends axially between the second splitter nose 32 and a first nozzle 34 for ejecting the first internal flow F11 from the turbine or the turbines. This hot compartment C1 is further delimited radially by first and second annular walls 36, 38, respectively internal and external, which extend coaxially around each other. The first wall 36 externally defines the duct V11 for the flow of the first internal flow F11, and the second wall 38 internally defines the duct V12 for the flow of the second external flow F12.

The second annular compartment C2, called cold compartment, extends axially between the first splitter nose 22 and a second nozzle 40 for ejecting the second external flow F12. This cold compartment C2 is further delimited radially by third and fourth annular walls 42, 44, respectively internal and external, which extend coaxially around each other. The third wall 42 externally defines the duct V12 for the flow of the second external flow F12, and the fourth wall 44 internally defines the duct V2 for the flow of the secondary flow F2.

The turbine engine 10 comprises, downstream of the propeller 20 and the splitter nose 22, stator vanes 21 which extend radially outwards from the wall 44 and through the duct V2.

The pylon 28 comprises a free end 28a upstream. This free end 28a is located here between two adjacent stator vanes 21 or at the level of the root of one of these vanes 21. The free end 28a of the pylon 28 is located between the leading and trailing edges of the stator vanes 21.

The cold compartment C2 is designed to house equipment of the turbine engine 10, as will be described in more detail below.

The turbine engine 10 is suspended from the pylon 28 by means of upstream suspension members 48 and downstream suspension members 50.

The upstream suspension members 48 are located in a first plane P1 perpendicular to the axis X and which are connected or attached to the gas generator 12. The downstream suspension members 50 are located in a second plane P2 perpendicular to the axis and are connected or attached to the gas generator 12.

According to the invention, these planes P1, P2 are located axially between the first splitter nose 22 and the second nozzle 40, i.e. at the level of the cold compartment C2. Furthermore, at least one part of these suspension members 48, 50 are connected or attached to the wall 42.

In the example shown, Dext1 is less than Dext 2, and Dint1 is less than the maximum diameter of the wall 44 so that a lower part of the pylon 28 is housed in the cold compartment C2, as shown in the figure.

The one or more members 48 are located at the upstream end 28a of the pylon 28 and may be located just downstream of the splitter nose 22. They may be attached or connected to the wall 42 and/or to the wall 44.

The members 48 may be located substantially in line with the splitter nose 32. In other words, the plane P1 may pass substantially at the level of the splitter nose 32 or just upstream of the latter, as shown in the drawing.

Thrust-absorbing rods 56 extend from the members 48 to the gas generator 12. The connecting rods 56 extend radially outwardly from upstream to downstream and comprise first radially internal ends 56a connected, for example by clevises, to the wall 42 or to points W of the gas generator 12 located radially inwardly of this wall 42. These points W may be located upstream of the splitter nose 32. However, this is not always the case, as illustrated by the alternatives 14 to 16 described below.

The connecting rods 56 comprise second radially external ends 56b which are located in a third plane P3 perpendicular to the axis X. The plane P3 is located between the planes P1 and P2. These second ends 56b are, for example, connected by a spreader to the pylon 28, just downstream of the members 48.

The members 50 are located downstream of the members 48 and are attached or connected to the wall 42. They are located inside the cold compartment C2.

The wall 42 is connected to the wall 38 by tubular arms 60 which extend radially into the duct V12 and are used for the passage of auxiliaries through this duct. The auxiliaries are, for example, electrical harnesses and cables, oil pipelines, ventilation conduits, etc. The walls 38, 42 and the arms 60 form a whole called the assembly 62.

Alternatively, the arms 60 could be replaced by (non-tubular) reinforcements.

The assembly 62 is intended to be attached to the downstream end of the casing 54. The wall 42 has its upstream end attached to the downstream end of the ferrule 56b, and the wall 38 has its upstream end attached to the hub 56a.

Figure 8:
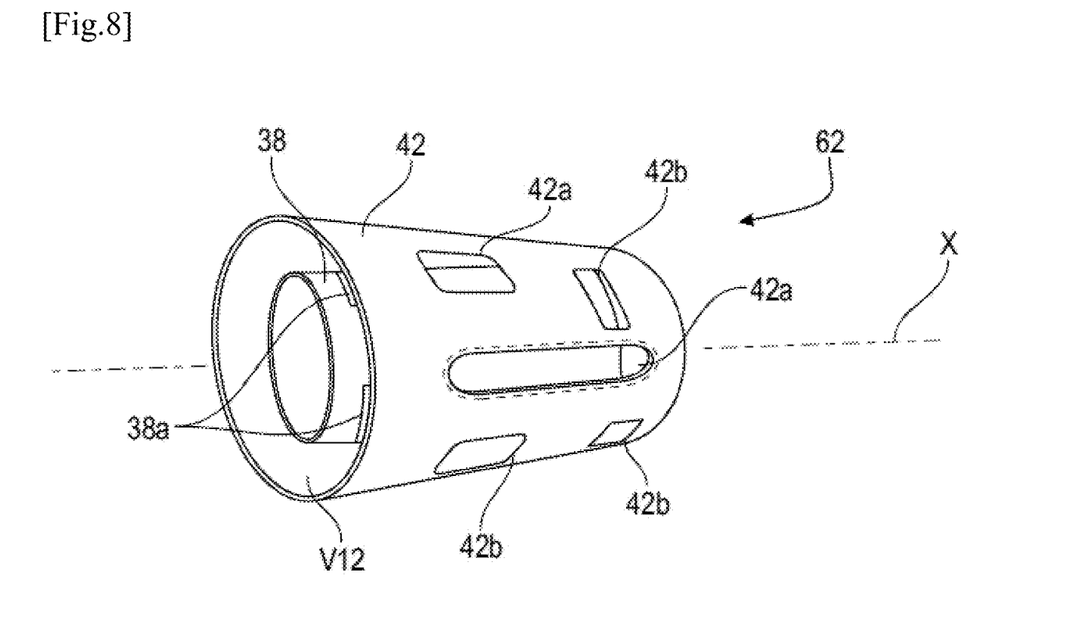
FIG. 8 is a schematic perspective view of an assembly for the turbine engine of FIG. 7.
Figure 9:
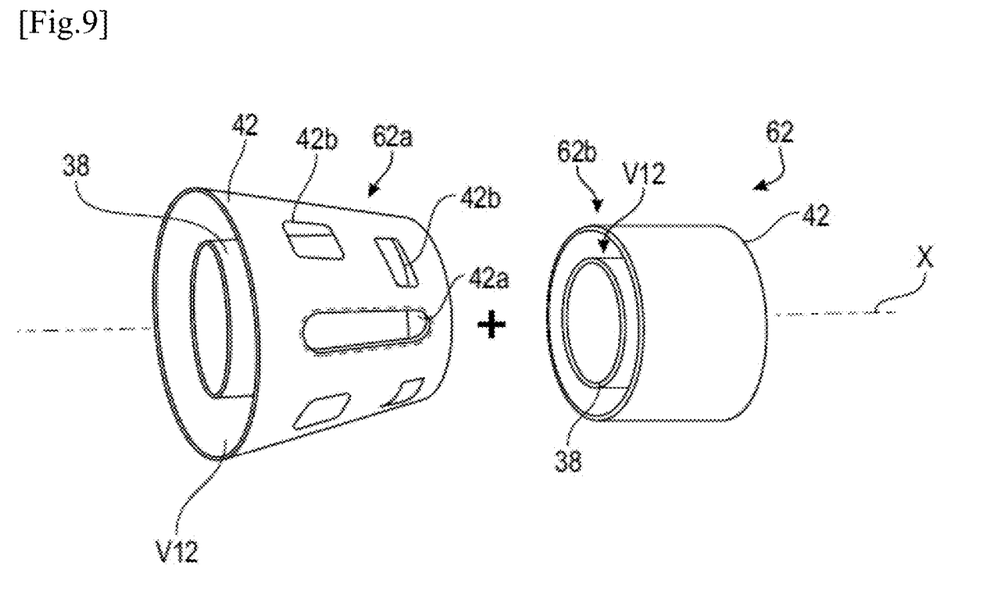
FIG. 9 is a schematic perspective view of an alternative embodiment of the assembly for the turbine engine of FIG. 7.
Figure 10:
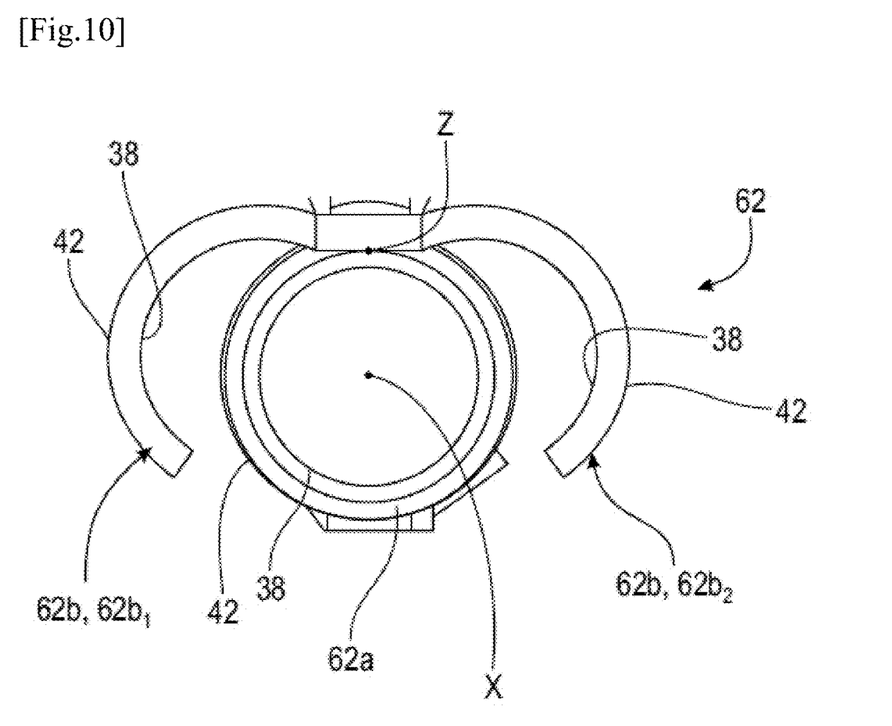
FIG. 10 is a schematic view of an alternative embodiment of the assembly of FIG. 9, seen from the front from the downstream face.

FIGS. 8 to 10 illustrate example embodiments of this assembly 62.

In the case of FIG. 8, the assembly 62 is in one piece. The wall 42 comprises orifices 42a which open into the internal cavities of the arms 60 for the passage of the aforementioned auxiliaries. The wall 42 further comprises openings 42b that are configured to allow maintenance and inspection operations to be performed. These openings 42b are intended to be sealed by removable hatches which are not shown. These hatches can be dismounted and removed through similar openings provided on the wall 44 for example.

Similarly, the wall 38 may comprise similar openings 38a to allow maintenance and inspection operations to the interior of the assembly 62. The openings 42b, 38a in the walls 38, 42 are preferably radially aligned with each other.

The assembly 62 of FIG. 8 is structural and configured to transmit the forces from the turbine engine 10 to the pylon 28 during operation.

In the case of FIG. 9, the assembly 62 comprises two segments, respectively upstream 62a and downstream 62b. The upstream segment 62a is similar to the assembly 62 in FIG. 8. The downstream segment 62b is intended to be detachably attached to the downstream end of the upstream segment 62a. More specifically, the downstream segment 62b comprises a portion of the wall 42 that is intended to be detachably attached to the portion of the wall 42 of the segment 62a, and a portion of the wall 38 that is intended to be detachably attached to the portion of the wall 38 of the segment 62a.

The upstream 62a and the downstream 62b segments are each of the O-Duct type, i.e., they each form an uninterrupted annular conduit, as described in the document FR-A1-2 981 989.

FIG. 10 illustrates an alternative embodiment of the assembly 62 in which the upstream segment 62a of the O-Duct type is associated with a downstream segment 62b of the D-Duct type. The segment 62b is formed of two half-shells 62b1, 62b2 articulated with respect to each other about an axis Z substantially parallel to the axis X. The opening of the segment 62b, by pivoting the half-shells 62b1, 62b2 about the axis X, allows access to the interior of the segment 62b during a maintenance or inspection operation.

Figure 11:
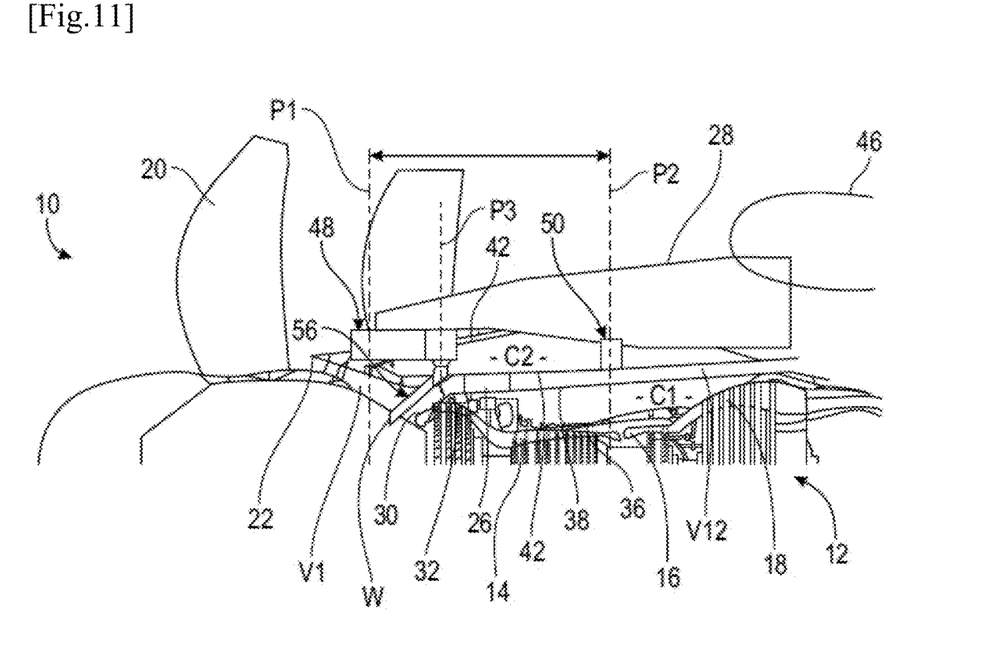
FIG. 11 is a view similar to that of FIG. 7 and illustrates an alternative embodiment of a turbine engine according to the invention and its suspension pylon to an aircraft.

FIG. 11 shows exchangers 26 housed in the duct V12.

Figure 12:
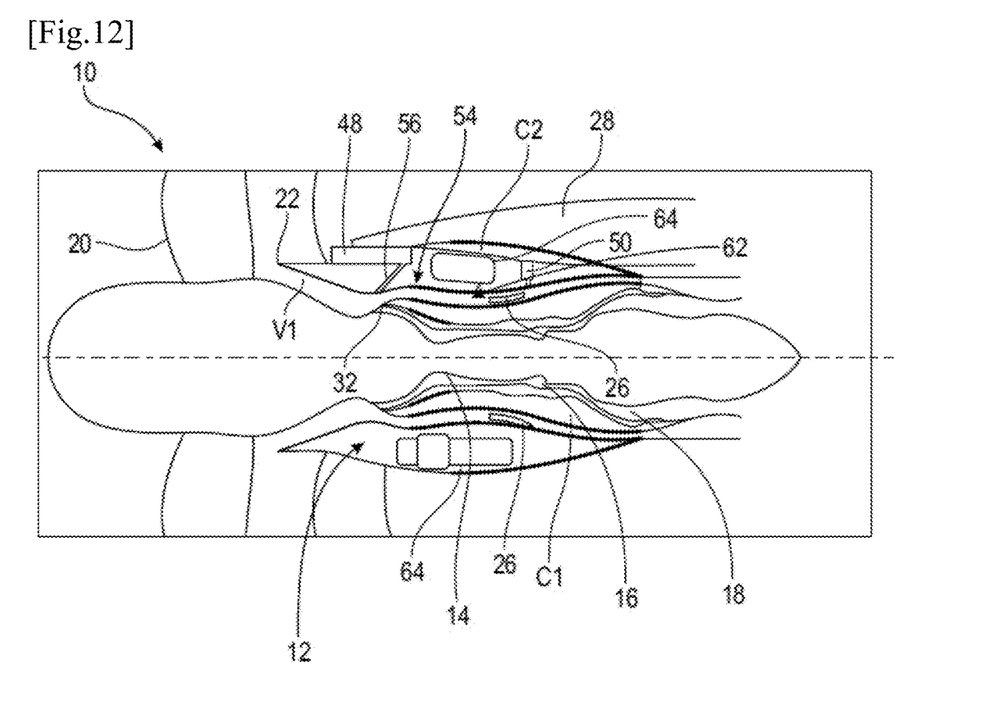
FIG. 12 is a view similar to that of FIG. 7 and illustrates another alternative embodiment of a turbine engine according to the invention and its suspension pylon to an aircraft.

FIG. 12 shows equipment 64 housed in the cold compartment C2. The center distance between the planes P1, P2 and the positioning of the connecting rods 56 at the level of the members 48 allows to free up space in the compartment C2 for the installation of the equipment 64. In particular, such equipment 64 may comprise electronic equipment, an accessory box or gear box, etc.

In yet another variant not shown, the turbine engine 10 according to the invention could be of the type shown in FIG. 6 and comprise at least one main propeller 20, or a propeller doublet, downstream of the gas generator 12.

Figure 13:
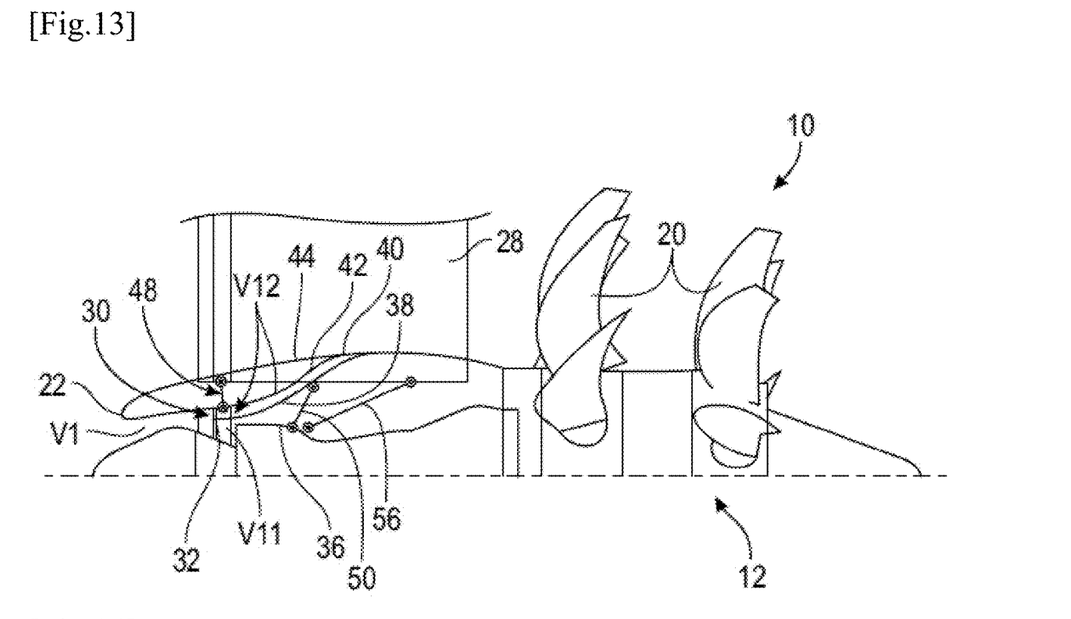
FIG. 13 is a view similar to that of FIG. 7 and illustrates another alternative embodiment of a turbine engine according to the invention and its suspension pylon to an aircraft.

This is in particular the case of the alternative embodiment shown in FIG. 13 in which the upstream suspension members 48 are located at the level of the cold compartment C2, the thrust-absorbing rods 56 extend from the gas generator 12 to a point of attachment to the pylon 28, and the downstream suspension members 50 are located between the suspension members 48 and the thrust-absorbing rods 56.

Figure 14:
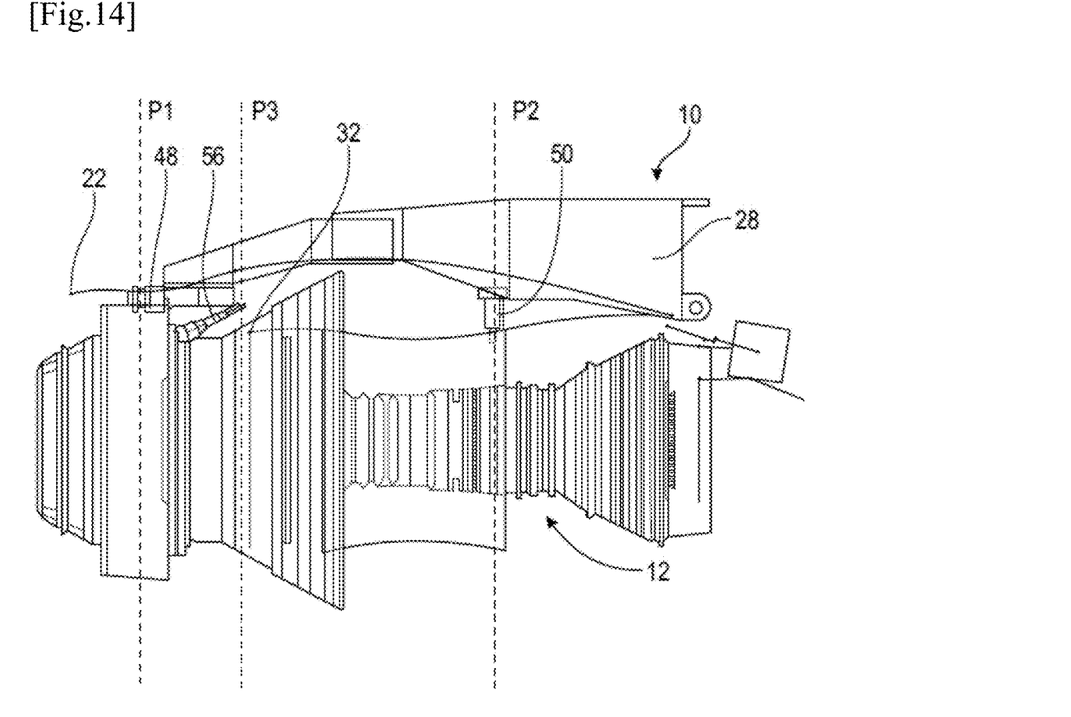
FIG. 14 is a view similar to that of FIG. 7 and illustrates another alternative embodiment of a turbine engine according to the invention and its suspension pylon to an aircraft.
Figure 15:
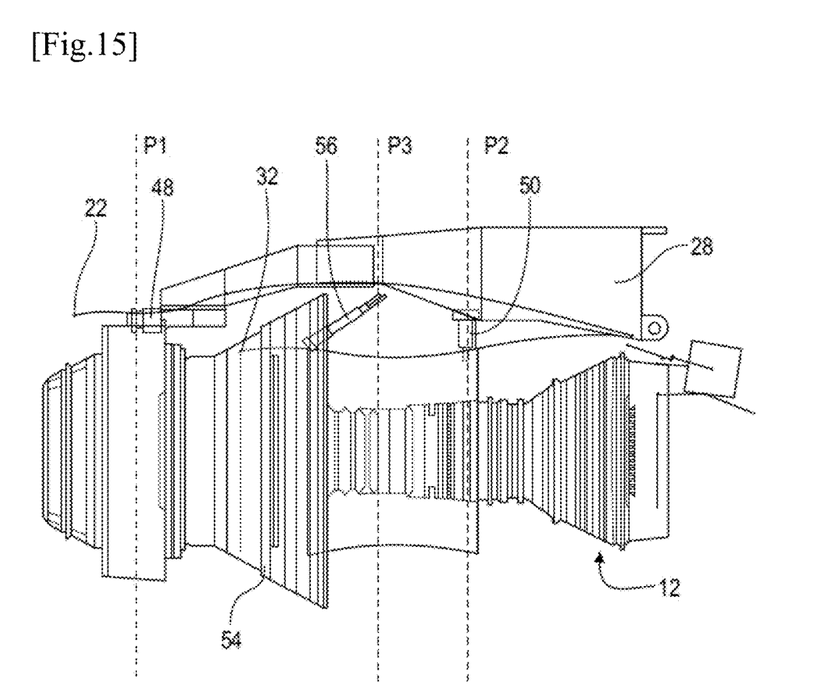
FIG. 15 is a view similar to that of FIG. 7 and illustrates another alternative embodiment of a turbine engine according to the invention and of its suspension pylon to an aircraft.
Figure 16:
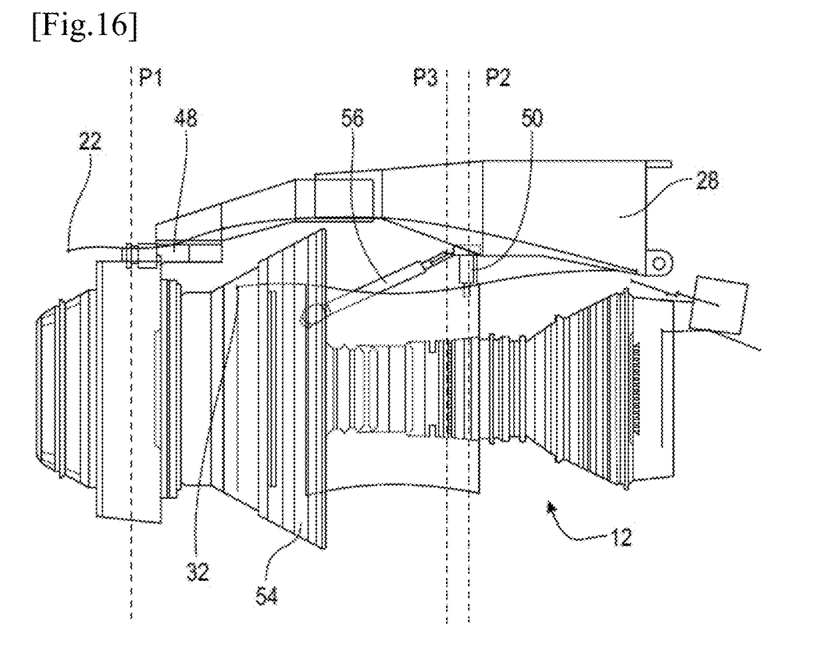
FIG. 16 is a similar view to FIG. 7 and illustrates another alternative embodiment of a turbine engine according to the invention and its suspension pylon to an aircraft.

The variants illustrated in FIGS. 14 to 16 show that the thrust-absorbing rods 56 can be located upstream of the splitter nose 32, between the gas generator 12 and the pylon 28 (FIG. 14), downstream of the splitter nose 32, between the internal casing 54 and the pylon 28 (FIG. 15—the plane P3 is here receded), or downstream of the splitter nose 32, between the internal casing 54 and the pylon 28 (FIG. 16—the plane P3 is here receded and almost merged with the plane P2).

The turbine engine 10 according to the invention has many advantages among which:

The cold compartment C2 is relatively large, which is advantageous for housing the equipment 64.

Another advantage is to have a cold compartment C2 protected from fire and thermal radiation by the duct V12 for the flow of the flow F12, which allows to increase the service lifetime of the equipment 64 installed in this compartment C2 while optimizing their design without very high temperature resistance constraints.

Moreover, from an aerodynamic point of view, the diameter of the duct V12 is relatively small compared to the prior art, which means that the radial dimension of the duct is larger for the same passage cross-section compared to the current technique, which facilitates the integration of the heat exchangers.

In addition, it is easier to control the mach in the duct V12 (the mach in the duct is directly related to the passage cross-section). Indeed, with a larger diameter duct, a very small deviation in the radial dimension of the duct has a strong impact on the passage cross section.

The invention claimed is:

1. A triple-flow turbine engine for an aircraft, this turbine engine having a longitudinal axis and comprising:
   a gas generator comprising at least one compressor, an annular combustion chamber, and at least one turbine,
   at least one main propeller rotated by a shaft of the gas generator,
   the gas generator comprising:
   a first annular splitter nose for separating two annular ducts for the respective flow of an internal primary flow inside the gas generator and an external secondary flow around the gas generator,
   a second annular splitter nose for separating two annular ducts for the respective flow of a first internal flow and of a second external flow,
   a first nozzle for ejecting the first internal flow,
   a second nozzle for ejecting the second external flow,
   a first annular compartment, referred to as hot compartment, extending axially between the second splitter nose and the first nozzle, and between first and second annular walls, respectively internal and external, which extend around each other, the first wall externally defining said duct for the flow of the first internal flow, and said second wall internally defining said duct for the flow of the second external flow,
   a second annular compartment, referred to as cold compartment, extending axially between the first splitter nose and the second nozzle, and between third and fourth annular walls, respectively internal and external, which extend around each other, the third wall externally defining said duct for the flow of the second external flow, and said fourth wall internally defining said duct for the flow of the secondary flow,
   upstream suspension members of the turbine engine, which are located in a first plane perpendicular to said axis and which are connected or attached to the gas generator,
   downstream suspension members of the turbine engine, which are located in a second plane perpendicular to said axis and which are connected or attached to the gas generator, and
   thrust-absorbing rods which comprise first ends connected or attached to the gas generator and opposite second ends located in a third plane perpendicular to said axis,
   wherein said first, second and third planes are located axially between the first splitter nose and the second nozzle, and in that at least one part of said upstream and downstream suspension members are connected or attached to said third wall.

2. The turbine engine according to claim 1, wherein the downstream suspension members are attached or connected to said third wall.

3. The turbine engine according to claim 1, wherein the downstream suspension members are located in the cold compartment.

4. The turbine engine according to claim 1, wherein the upstream suspension members are attached to the third wall and/or to the fourth wall.

5. The turbine engine according to claim 4, wherein the upstream suspension members are located just downstream of said first splitter nose.

6. The turbine engine according to claim 1, wherein said thrust-absorbing rods extend from the upstream suspension members or downstream of these members to connection points on the gas generator, these connection points being located inside the third wall.

7. The turbine engine according to claim 1, wherein at least one part of said second and third walls are connected together by tubular reinforcements or arms, to form an assembly.

8. The turbine engine according to claim 7, wherein the second and third walls comprise openings and removable hatches for closing these openings.

9. The turbine engine according to claim 7, wherein said assembly forms a segment in one piece.

10. The turbine engine according to claim 7, wherein said assembly comprises a first segment in one piece and a second segment which can be detached from the first segment and which can itself be in one piece or formed of two half-shells articulated with respect to each other about an axis substantially parallel to said longitudinal axis.

11. The turbine engine according to claim 1, wherein at least one heat exchanger is located in said second external flow duct, and/or at least one equipment, such as an accessory box or gearbox, is located in said cold compartment.

12. The turbine engine according to claim 1, wherein said at least one main propeller is located upstream of the gas generator.

13. The turbine engine according to claim 1, wherein said at least one main propeller is located downstream of the gas generator.

14. The turbine engine according to claim 1, wherein it comprises a secondary propeller driven in rotation by a shaft of the gas generator, this propeller being located in the duct for the flow of the primary flow and upstream of said second annular splitter nose.

15. An assembly comprising a turbine engine according to claim 1, and a pylon for hanging this turbine engine to an aircraft, the pylon having a generally elongate shape and being connected or attached respectively to the upstream and downstream suspension members of the turbine engine.

* * * * *